(12) United States Patent
Lee

(10) Patent No.: US 6,854,778 B2
(45) Date of Patent: Feb. 15, 2005

(54) UPPER TRAY MOUNTING STRUCTURE

(75) Inventor: Kang-Wook Lee, Kyunggi-do (KR)

(73) Assignee: Hyundai Mobis, Co., Ltd., Kyunggi-do (KR)

( * ) Notice: Subject to any disclaimer, the term of this patent is extended or adjusted under 35 U.S.C. 154(b) by 0 days.

(21) Appl. No.: 10/330,333

(22) Filed: Dec. 30, 2002

(65) Prior Publication Data

US 2004/0041426 A1 Mar. 4, 2004

(30) Foreign Application Priority Data

Aug. 30, 2002 (KR) ................................ 10-2002-0052025

(51) Int. Cl.$^7$ ................................................. B60R 7/06
(52) U.S. Cl. .................................................. 296/37.12
(58) Field of Search ............................ 296/37.12, 37.8, 296/70, 76

(56) References Cited

U.S. PATENT DOCUMENTS

| | | | | |
|---|---|---|---|---|
| 4,552,399 A | * | 11/1985 | Atarashi | .................. 296/37.12 |
| 4,596,416 A | * | 6/1986 | Muller | ..................... 296/37.12 |
| 4,776,626 A | * | 10/1988 | Seyler | ........................... 296/76 |
| 4,966,403 A | * | 10/1990 | Nordstrom | .................... 296/76 |
| 5,520,313 A | * | 5/1996 | Toshihide | ................ 296/37.12 |
| 6,050,628 A | * | 4/2000 | Allison et al. | ........... 296/37.12 |

FOREIGN PATENT DOCUMENTS

| | | |
|---|---|---|
| KR | 1996-04716 | 9/1998 |
| KR | 20-0264795 | 2/2002 |

* cited by examiner

Primary Examiner—Lori L. Coletta
(74) Attorney, Agent, or Firm—Greenblum & Bernstein, P.L.C.

(57) ABSTRACT

An upper tray mounted on an instrument panel of a vehicle includes a receiving member mounted on an upper portion of the instrument panel. A hinge member is movably attached to the receiving member. A cover member is joined to the hinge member to rotate about a fixed pivot and configured to close the receiving member. A coil spring connects the hinge member with the receiving member. The coil spring is configured to provide a force in a direction that the cover member opens.

13 Claims, 3 Drawing Sheets

[FIG. 1] PRIOR ART
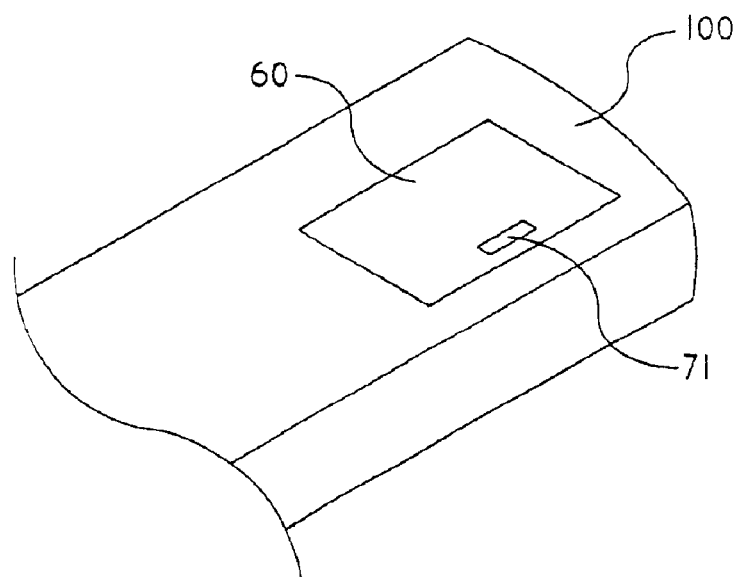
[FIG. 2] PRIOR ART
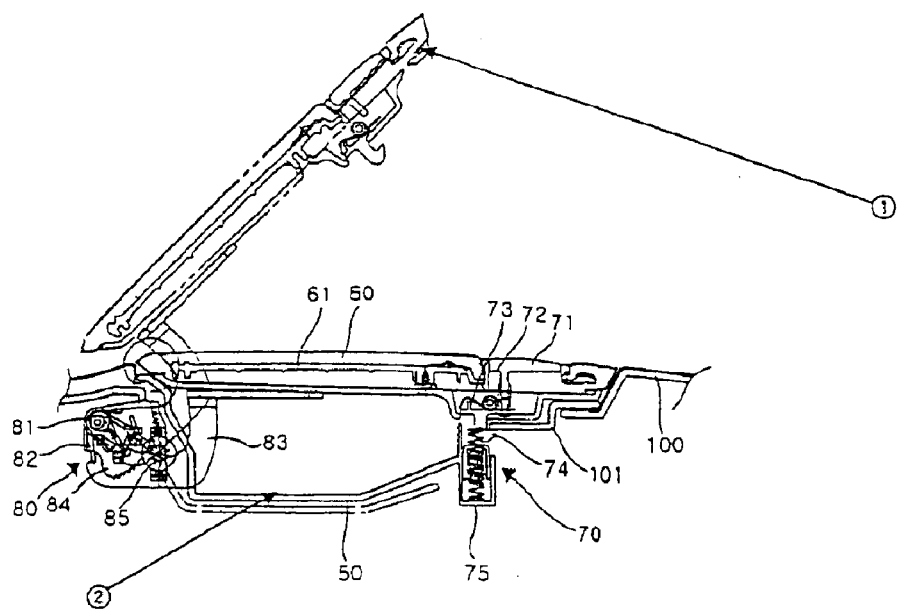

[FIG. 3] PRIOR ART
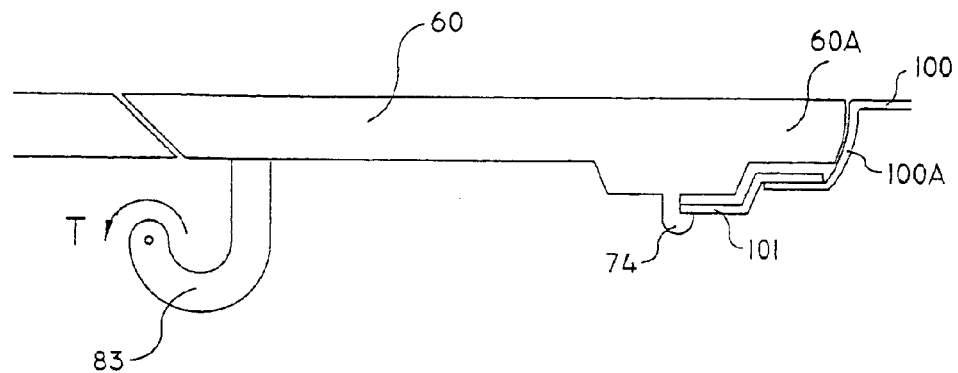
[FIG. 4]
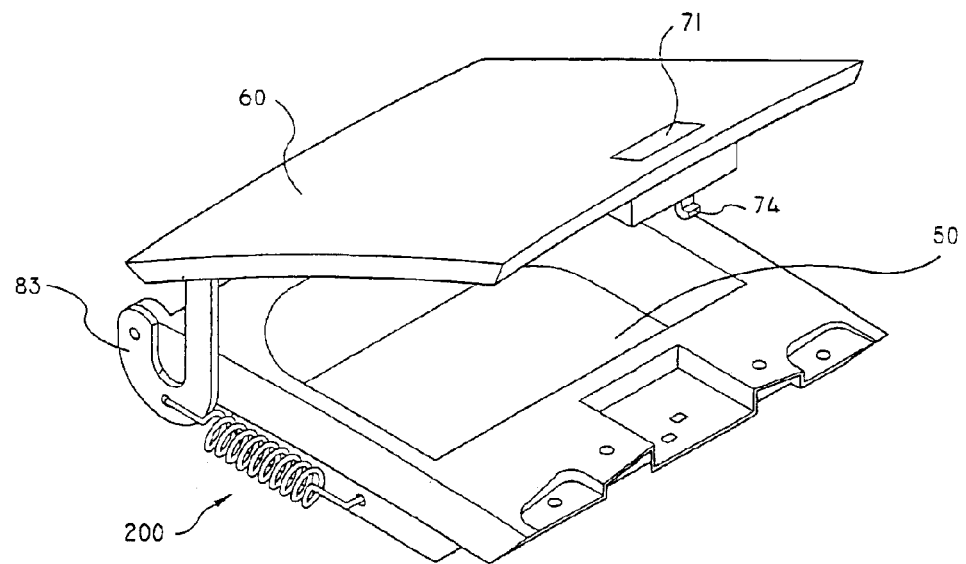

[FIG. 5]
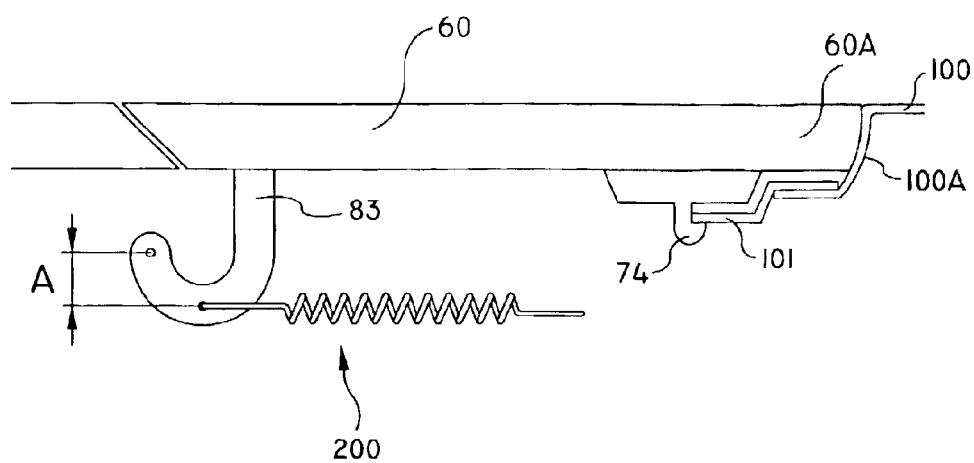

UPPER TRAY MOUNTING STRUCTURE

BACKGROUND OF THE INVENTION

1. Field of the Invention

The present invention relates to an upper tray mounted on an instrument panel of a vehicle.

2. Description of the Related Art

Generally, there may be receiving spaces at many places in an interior of a vehicle. Presently, for a receiving space in an interior of a vehicle, a glove box is mounted on the instrument panel, which is a front side of a death seat, conventionally referred to as a "front passenger seat". In case that an air bag is not installed within an upper portion of the instrument panel, which is the front side of the death seat, the space could be utilized as a receiving space.

As mentioned above, the member (referred to an upper tray hereinafter) mounted on the upper portion of the instrument panel, which is a front side of the death seat, is a useful space for receiving a cellular phone, a booklet, a cigarette, a map and a lighter.

For the related art regarding such upper tray, there exist a Korean Utility Model Publication No.1996-004716 and a Korean Utility Model Registration No.20-0264795, which has been filed and registered at KIPO (Korean Intellectual Property Office) by the present applicant prior to the present application.

FIG. 1 and FIG. 2 are drawings illustrating an upper tray of the related art.

As shown in FIG. 1 and FIG. 2, the upper tray of the related art is mounted on the upper portion of the instrument panel 100 in a front side of the death seat, and includes: a receiving member 50; a cover member 60 for covering a space of the receiving member 50; an opening and shutting means 70 for opening and shutting the cover member 60 at right before a passenger, namely, at one side of the receiving member 50; a rotating means 80 positioned on the other side of the receiving member, namely, on a side opposite to the opening and shutting means 70, for rotating so that locking of the opening and shutting means 70 may be released and, at the same time, the cover member 60 may be opened.

The opening and shutting means 70 consists of: a locking release knob 71 provided to an upper surface of the cover member 60; a hook 74 whose hooked status at a lower end of a frame 101, is released by operation that one side of a spring 73 inserted into a shaft 72 is pressed and rotated as the locking release knob 71 is lowered; an open spring 75 installed on a lower side of the hook 74, for pushing up a lower end of the hook 74 so that the cover member 60 may be opened upon release of the locking status between the hook 74 and the frame 101.

Also, the rotating means 80 consists of: a twisting spring 82 inserted into a rotational shaft 81; a hinge member 83 extended from one side of the cover member 60 and inserted into the rotational shaft 81, for pivoting on the rotational shaft 81, and, at the same time, for pressing the twisting spring 82 as the cover member 60 is opened and closed, by having the twisting spring 82 in its interior; a rack 84 and pinion 85 installed on an inner side of the hinge member 83.

Because the upper tray of the related art as mentioned above, is installed on a portion that directly receives a direct ray of light from a windshield glass, it is apt to be exposed to a high temperature due to temperature rise and a direct ray of light during summer times. Particularly, in summer times that receive a direct ray of lights, twisting is apt to be generated on a cover of the upper tray by transformation due to heat.

Also, as the twisting spring is installed in a central shaft of the hinge member in the upper tray of the related art, torque T is applied by the twisting spring installed to the shaft of the hinge member, to the cover in case that the cover is closed (refer to FIG. 3).

As the cover member 60 is supported in its one point by the hook 74, the cover member 60 is transformed into swollen shape in its center due to influence of torque applied to the cover member 60 and a direct ray of light.

In order to prevent such transformation, a steel member could be inserted into an interior of the cover member. But in that case, formation of the cover member becomes complicated, material costs are raised and, therefore, a problem that manufacturing costs would be raised, is generated.

SUMMARY OF THE INVENTION

To solve the above-indicated problems, it is, therefore, an object of the present invention to provide an upper tray mounted on an instrument panel of a vehicle, capable of suppressing twisting transformation generated in the cover member of the upper tray.

The foregoing and other objects and advantages are realized by providing an upper tray mounted on an instrument panel of a vehicle which includes: a receiving member mounted on an upper portion of the instrument panel in a death seat; a hinge member installed, for being able to rotate with respect to the receiving member; a cover member joined to the hinge member and installed with being closed on the instrument panel; a coil spring connecting the hinge member and the receiving member.

By the foregoing construction, torque applied to the cover member is reduced, whereby twisting transformation in the cover member is reduced.

Also, the upper tray mounted on the instrument panel of the present invention, is characterized in that an end portion of the cover member and the opening plane of the instrument panel come into plane contact with each other in case that the cover member is closed.

By such construction, frictional force applied between the end portion of the cover member and the opening plane of the instrument panel, resists twisting torque applied to the cover member, so that twisting transformation in the cover member is reduced.

BRIEF DESCRIPTION OF THE DRAWINGS

The above objects, features and advantages of the present invention will become more apparent from the following detailed description when taken in conjunction with the accompanying drawings, in which:

FIG. 1 is a perspective view of an instrument panel on which an upper tray of the related art is mounted;

FIG. 2 is a cross-sectional view illustrating an upper tray structure of the related art;

FIG. 3 is a schematic drawing for explaining problems of the related art;

FIG. 4 is a perspective view illustrating a structure of an upper tray of the present invention; and FIG. 5 is a schematic drawing for explaining operation of the present invention.

DETAILED DESCRIPTION OF THE PREFERRED EMBODIMENT

A preferred embodiment of the present invention will now be described with reference to the accompanying drawings.

In the following description, same drawing reference numerals are used for the same elements even in different drawings.

FIG. 4 is a perspective view illustrating an upper tray of the present invention and FIG. 5 is a schematic drawing for explaining operation of the present invention.

As shown in FIG. 4, the upper tray mounted on the instrument panel of the present invention includes a receiving member 50 and a cover member 60.

The receiving member 50 has a receiving space for keeping goods, and is attached to the instrument panel 100.

In order to open and close the receiving space of the receiving member 50, the cover member 60 has a hinge member 83. The hinge member 83 and the receiving member 50 are connected by a hinge shaft and are rotatable.

The cover member 60 has a knob 71 and a hook 74. When the knob 71 is pressed, the hook 74 is rotated, so that the hook 74 is detached from a hooking groove of the receiving member. Of course, a structure that the hook 74 is rotated by rotation of the knob 71, may be possibly used. As the knob 71 and the hook 74 are frequently adopted means for locking the cover member mounted on the receiving space, description of detailed structure thereof, is omitted.

The hinge member 83 and the receiving member 50 are connected by the coil spring 200. The coil spring 200 is preferably installed on both sides of the receiving member 50.

In case that the cover member 60 is closed, the length of the coil spring 200 is longer than the free length (the length in case that force is not applied to the coil spring), so that the coil spring acts in the direction that opens the cover member 60, pivoting on a hinge shaft.

Force generated in the coil spring 200, pushes the cover member 60 toward backside of a vehicle, namely, the death seat direction, so that an end portion 60A of the cover member 60 comes into contact with an opening plane 100A of the instrument panel 100 as shown in FIG. 5.

Operation of the present invention will be described in the following.

When the knob 71 of the upper tray is moved, the hook 74 is detached from the hooking groove, and the cover member 60 is opened, and when the cover member 60 is pressed until the hook 74 is hooked on the hooking groove, the cover member 60 is maintained closed.

In case that the cover member 60 is closed, the coil spring 200 is extended between the hinge member 83 and the receiving member 50, so that the cover member 60 is automatically opened by elasticity of the coil spring 200 when the hook 74 is detached from the hooking groove.

In case that the cover member 60 is closed, torque is applied around the hinge shaft formed on the hinge member 83, but the length of a moment arm A from the center of the hinge shaft to a point on which the coil spring 200 is installed, could be set short, so that torque applied to the center of the hinge shaft becomes smaller than the torque in case of the related art as shown in FIG. 3. Therefore, as torque applied to the cover member 60 is small, twisting transformation generated in the cover member 60 could be suppressed as mush as possible.

Also, as force generated in the coil spring 200 pushes the cover member 60 toward the direction of a death seat passenger, the end portion 60A of the cover member 60 comes into contact with the opening plane 100A of the instrument panel 100 by sticking to it.

Therefore, frictional force exists between the end portion 60A of the cover member 60 and the opening plane 100A of the instrument panel 100 in proportional to force generated in the coil spring 200. As the above frictional force is exerted in the direction that resists torque applied to the center of the hinge shaft, possibility that twisting transformation is generated in the center of the cover member 60, is remarkably reduced.

The present invention adopts the construction that connects the hinge member and the receiving member by means of the coil spring, so that torque applied to the cover member is reduced, whereby transformation due to heat and twisting in the high temperature condition generated in the cover member, is possibly minimized.

Also, as the coil spring plays a role of getting the end portion of the cover member to stick to the opening plane of the instrument panel, twisting transformation generated in the cover member, is suppressed by frictional force generated between the end portion of the cover member and the opening plane of the instrument panel.

Namely, the present invention has an effect of minimizing transformation due to heat and twisting that could be generated in the cover member, without adoption of complicated construction that the steel member is inserted into the interior of the cover member.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An upper tray mounted on an instrument panel of a vehicle, comprising:

a receiving member mounted on an upper portion of the instrument panel;

a hinge member movably attached to the receiving member by a fixed pivot;

a cover member joined to the hinge member to rotate about said fixed pivot and configured to close the receiving member; and a coil spring that connects the hinge member with the receiving member, and being configured to provide a force in a direction that the cover member opens; and wherein when said cover member is closed, said coil spring urges an end portion of said cover member toward and into planar contact with an opening plane of said instrument panel to reduce twisting of said cover member.

2. The upper tray according to claim 1, wherein said coil spring is connected to said hinge member between an attachment point of said hinge member to said cover member and an attachment point of said hinge member to said fixed pivot.

3. The upper tray according to claim 1, wherein the cover member is configured to rotate to a position above the receiving member to allow access to the receiving member.

4. The upper tray according to claim 1, wherein the hinge member is J-shaped and the cover member is attached to one end of the J-shaped hinge, the fixed pivot being attached to the other end of the J-shaped hinge, and the coil spring being attached to the J-shaped hinge between the cover member attachment and the fixed pivot attachment.

5. The upper tray according to claim 1, wherein the cover member closes flush with the instrument panel.

6. The upper tray according to claim 1, wherein said hinge member being mounted to said receiver member at a position corresponding to an end of the cover member.

7. The upper tray according to claim 1, wherein a frictional force between the cover member and opening plane of the instrument panel resists a torque applied to a center of the hinge member to reduce the twisting of the cover member.

8. A tray mounted on a panel of a vehicle, comprising:

a receiver mounted on an upper portion of the panel;

a hinge pivotably attached to the receiver;

a cover connected to the hinge and configured to rotate to an open position above the receiver; and a coil spring connected to the hinge and the receiver, and being configured to provide a force in a direction that biases the cover to the open position, wherein, when said cover is closed, said coil spring urges an end portion of said cover toward and into planar contact with an opening plane of the panel to reduce twisting of said cover.

9. The upper tray according to claim 8, wherein said coil spring is connected to said hinge member between an attachment point of said hinge member to said cover member and an attachment point of said hinge member to said fixed pivot.

10. The upper tray according to claim 8, wherein the hinge is J-shaped and the cover is attached to one end of the J-shaped hinge, a fixed pivot being attached to the other end of the J-shaped hinge, and the coil spring being attached to the J-shaped hinge between the cover attachment and a fixed pivot attachment.

11. The upper tray according to claim 8, wherein the cover closes flush with the instrument panel.

12. The upper tray according to claim 8, wherein said hinge being mounted to said receiver at a position corresponding to an end of the cover.

13. The upper tray according to claim 8, wherein a frictional force between the cover and opening plane of the panel resists a torque applied to a center of the hinge to reduce the twisting of the cover.

* * * * *